Jan. 19, 1965 S. C. EARLEY 3,166,339
FOLDING LAWN CART
Filed Nov. 17, 1961 3 Sheets-Sheet 1
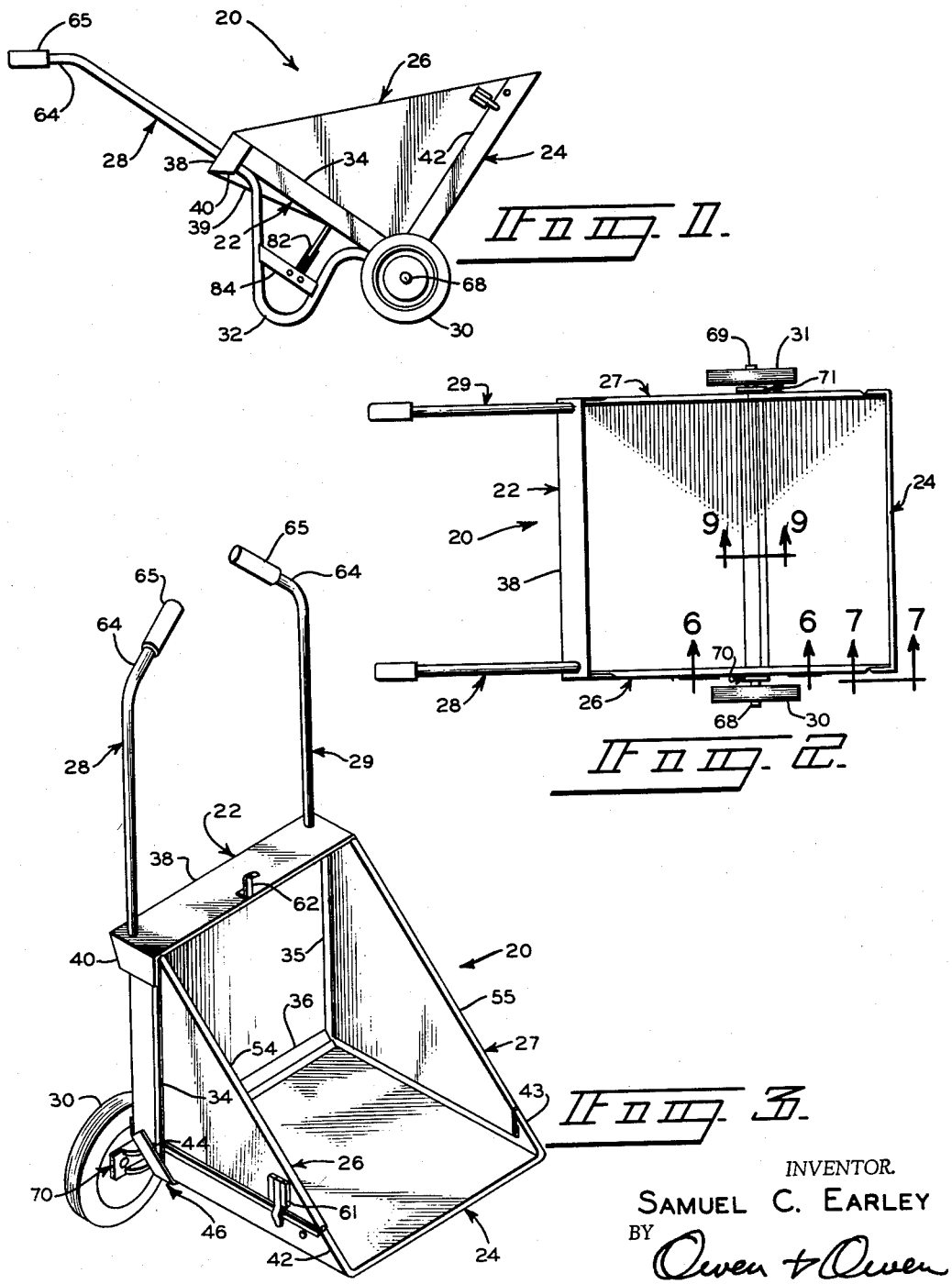
INVENTOR.
SAMUEL C. EARLEY
BY Owen & Owen
ATTORNEYS Jan. 19, 1965   S. C. EARLEY   3,166,339
FOLDING LAWN CART
Filed Nov. 17, 1961   3 Sheets-Sheet 2
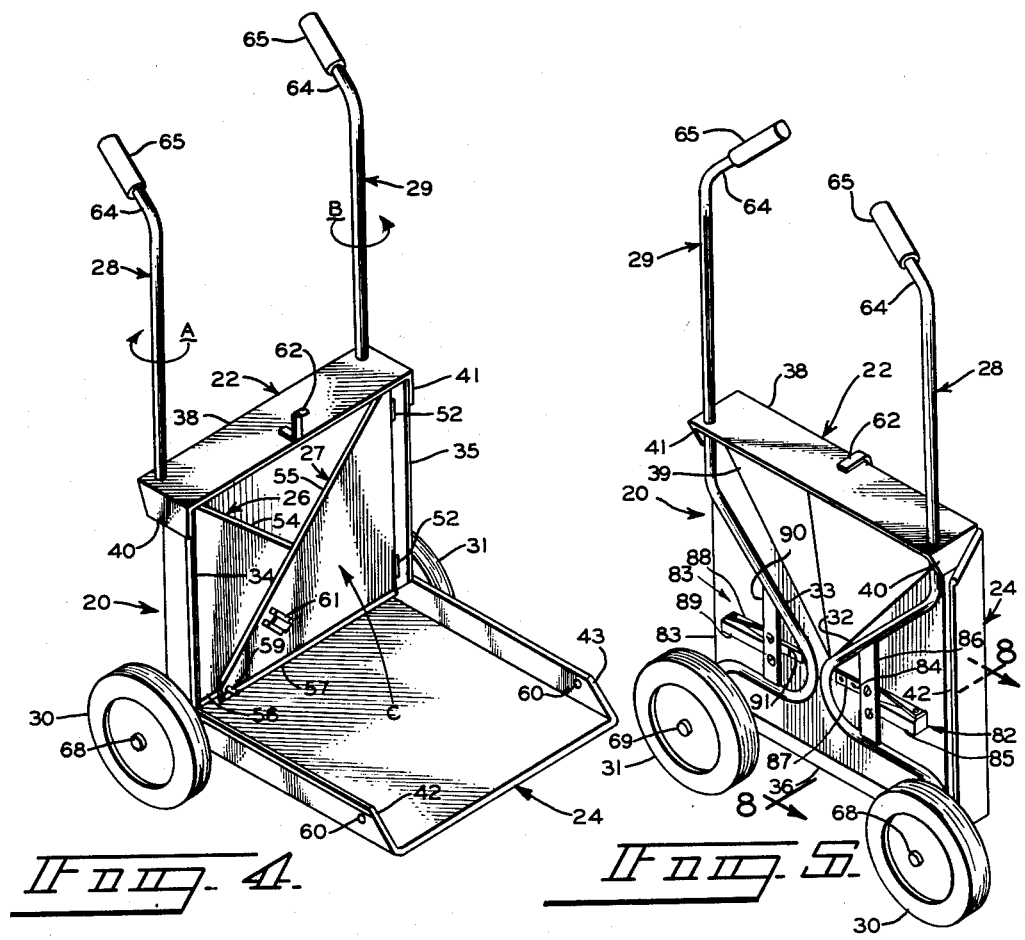
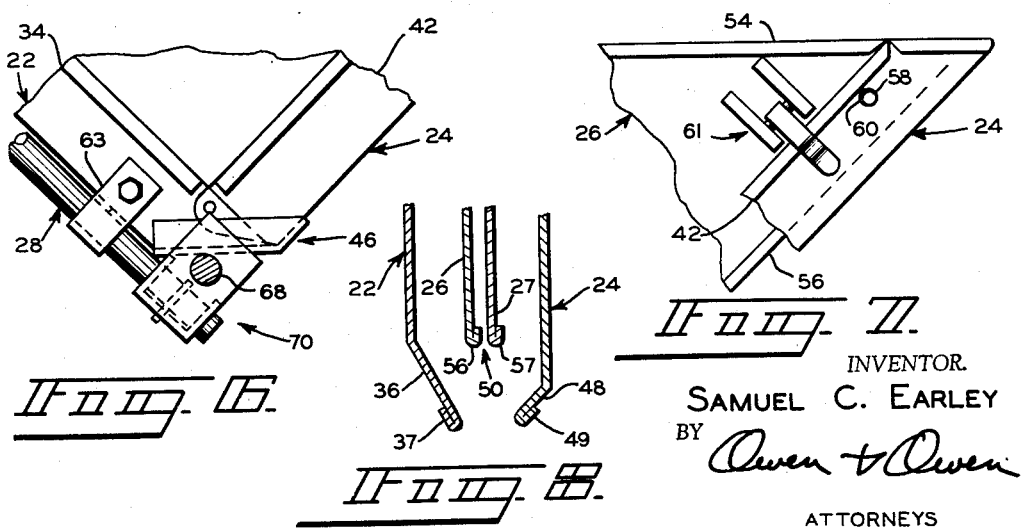
INVENTOR.
SAMUEL C. EARLEY
BY
ATTORNEYS

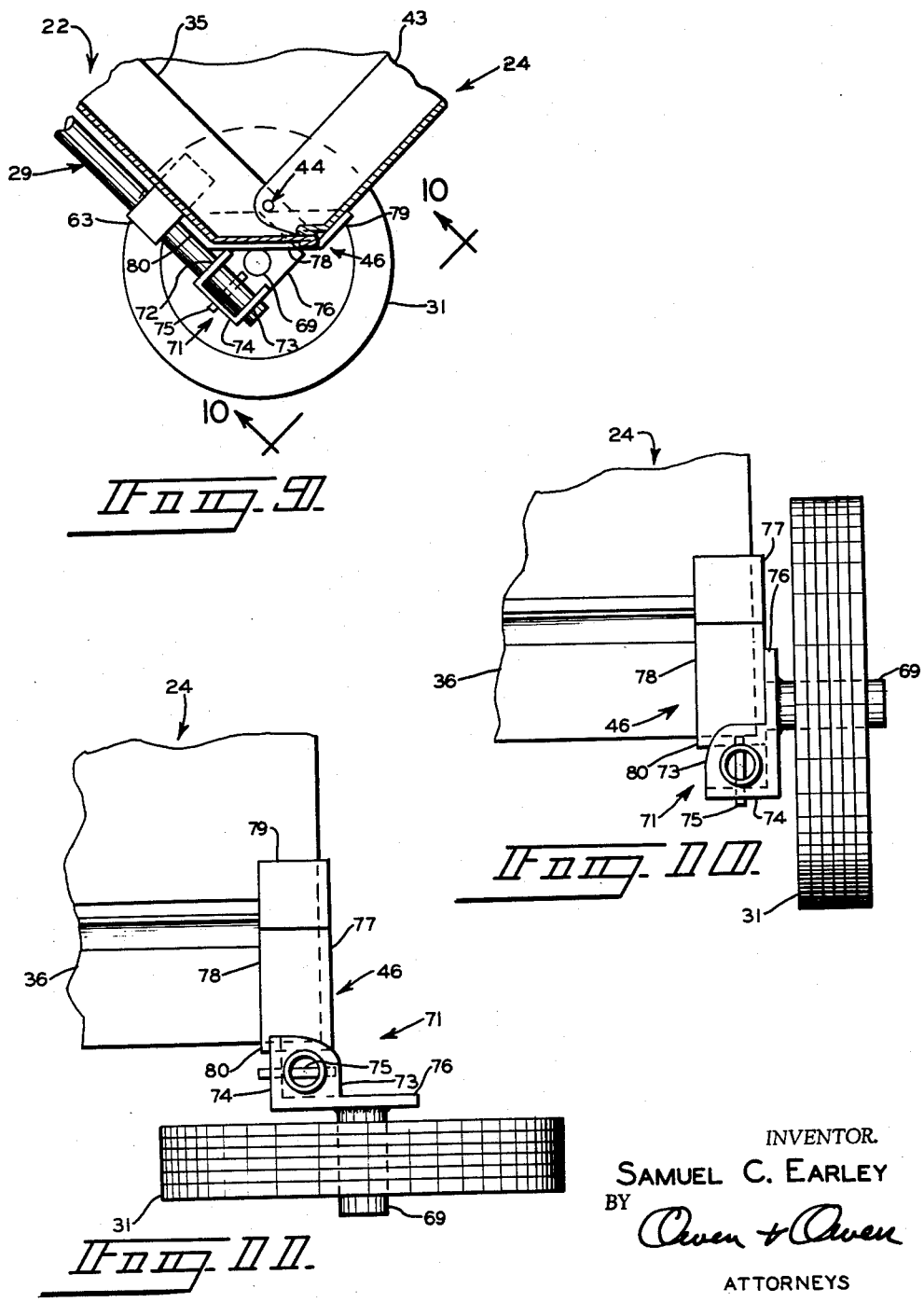

United States Patent Office 3,166,339
Patented Jan. 19, 1965

3,166,339
FOLDING LAWN CART
Samuel C. Earley, Toledo, Ohio, assignor to Sam C. Earley Corporation, Toledo, Ohio, a corporation of Ohio
Filed Nov. 17, 1961, Ser. No. 153,162
5 Claims. (Cl. 280—36)

The present invention relates to a wheeled cart which may be partially or fully folded, and to a lawn cart which has not only structural parts that may be collapsed to facilitate storage in a limited space but also wheels whose axles may be turned ninety degrees from their normal position for sideways movement.

Various structural arrangements have been proposed in lawn carts for facilitating storage in a limited space, but the resulting devices were deficient because the cart could not be partially folded for transporting material in containers that were too large to fit in the cart body. Many of these carts used removable parts which became lost when the cart was folded for storage, and certain of the carts were poorly balanced in that excessive effort was required to wheel them when they were loaded. Still another problem arising from the use of existing lawn carts is the fact that residue of the transported material remains after the cart has been dumped and folded.

It is, therefore, an object of the present invention to provide a folding lawn cart which is sturdily constructed yet economically manufactured.

Another object of the invention is to provide a lawn cart which may be partially folded for transporting material in containers and fully collapsed for storage in a limited space.

Still another object of the invention is to provide a wheeled lawn cart having axles which may be selectively rotated to enable the cart to be moved sideways.

A still further object of the invention is to provide a folding lawn cart having provisions for the escape of material residue therefrom when fully folded.

Other objects of the invention will be apparent from the specification which follows and from the drawings in which like numbers are used throughout to identify like parts.

In the drawings:

FIG. 1 is a side elevation of a folding lawn cart constructed in accordance with the invention;

FIG. 2 is a plan view of the lawn cart;

FIG. 3 is a perspective view of the lawn cart in its open or erected position with the wheel axles turned ninety degrees for sideways travel;

FIG. 4 is a perspective view of the lawn cart with the wheels in their normal position and the sides folded for transporting material in containers;

FIG. 5 is a perspective view showing the lawn cart in its completely collapsed position for storage;

FIG. 6 is a sectional view taken along the line 6—6 of FIG. 2;

FIG. 7 is an enlarged partial view taken from the position indicated by the line 7—7 in FIG. 2;

FIG. 8 is an enlarged partial sectional view taken along the line 8—8 in FIG. 5;

FIG. 9 is an enlarged partial sectional view taken along the line 9—9 in FIG. 2;

FIG. 10 is a view taken from the position indicated by the line 10—10 in FIG. 9; and FIG. 11 is a view taken from the same position as FIG. 10 showing one of the cart wheels rotated for sideways movement or storage.

In order to achieve the above objects, a cart is provided which includes a bottom having an upwardly directed front along the lowermost edge thereof together with upwardly directed sides extending along opposite longitudinal edges of the bottom to the front. The sides are hingedly mounted for movement from an erected position for carrying loose material to a folded position adjacent the bottom for carrying packaged material. The front is likewise hingedly mounted for selective swinging movement to a closed position adjacent the folded sides and bottom for storage. A pair of longitudinally extending handles having ground engaging legs and wheels are pivotally connected to the bottom for moving the wheels from planes that are normal to the bottom for forward movement to planes that are parallel to the bottom for sideways travel.

Referring now to the drawings and more particularly to FIGS. 1 to 5, there is shown a folding lawn cart 20 constructed in accordance with the invention. The cart 20 comprises a rectangular bottom 22 of a rigid material such as metal and a generally rectangular front 24 of a similar rigid material that is approximately the same size as the bottom 22. The front 24 is positioned along the lowermost edge of the bottom 22, and generally triangular shaped sides 26 and 27 of a rigid material extend between the bottom 22 and the front 24 along opposed edges thereof.

The cart 20 further includes a pair of longitudinally extending handles 28 and 29 having ground engaging wheels 30 and 31 respectively mounted on the forwardmost ends thereof. Downwardly extending legs 32 and 33 are formed on the handles 28 and 29 respectively to support the cart 20 in the position shown in FIG. 1 for transporting loose material such as dirt and fertilizer. As shown in FIGS. 1 and 2, the wheels 30 and 31 are positioned in the central portion of the cart 20 for balancing the weight of the loose material when the cart is filled.

The bottom 22 has a pair of upwardly directed flanges 34 and 35 extending along opposite longitudinal edges normal to the lowermost edge which is adjacent the front 24. These spaced flanges are substantially parallel to one another and are generally normal to the plane of the bottom 22 to impart additional rigidity thereto. The rigidity of the bottom 22 is further increased by a lip 36 that is angularly disposed to the plane of the bottom 22 as shown in FIGS. 6 and 8. The lip 36 extends transversely across the lowermost edge of the bottom 22 between the flanges 34 and 35, and has a rolled portion 37 along the outermost edge for further strength. The bottom 22 is further strengthened by a stiffener wall 38 that is secured to the uppermost edge of the bottom 22 opposite the lip 36 together with a triangular brace 39 in the central portion of the lower surface of the bottom 22. The transversely extending stiffener wall 38 is directed downwardly from the uppermost edge of the flanges 34 and 35 beyond the lower surface of the bottom 22, and the uppermost edge of the brace 39 is preferably adjacent the stiffener wall 38. Forwardly directed tabs 40 and 41 on opposed ends of the stiffener wall 38 engage the outer surfaces of the flanges 34 and 35 outwardly of the handles 28 and 29 respectively as shown in FIG. 4 while the opposite sides of the brace 39 slope inward and downward from the handles 28 and 29 toward a centrally located fold line that is parallel to these handles.

The front 24 has a pair of mating flanges 42 and 43 extending along opposed longitudinal edges thereof as shown in FIGS. 3 and 4. The flanges 42 and 43 are parallel and extend at right angles to the plane of the front 24 to impart rigidity thereto.

The lowermost end portions of the front flanges 42 and 43 are pivotally attached to lowermost end portions of the bottom flanges 34 and 35 respectively by any convenient hinging means 44 such as pins extending from the bottom flanges 34 and 35 through the mating front flanges 42 and 43. A pair of suitable stops 46 which will be described later in detail are provided on opposite sides of the bottom 22 for limiting the movement of the front 24 to the open position. The hinging means 44 enables the front 24 to swing from the open position for carrying material, either loose as shown in FIG. 1 or packaged as shown in FIG. 4, to a closed position shown in FIG. 5 for storage. The spacing between the flanges 42 and 43 is slightly greater than the corresponding spacing between the bottom flanges 34 and 35 so that when the front 24 is in the closed position shown in FIG. 5 the front flanges 42 and 43 overlie the bottom flanges 34 and 35 in substantial juxtaposition.

Additional rigidity is imparted to the front 24 by a transversely extending mating lip 48 along the lowermost edge thereof adjacent the bottom lip 36 as shown in FIGS. 6 and 8. The lip 48 is additionally strengthened by a rolled portion 49, and in addition to strengthening the front 24, the lip 48, which is angularly disposed to the plane of the front 24, engages the bottom lip 36 when the front 24 is in the open position to prevent escape of loose material. When the front 24 is moved to the closed position shown in FIG. 5, the front lip 48 moves away from the bottom lip 36 as shown in FIG. 8 to provide a slot 50 that enables any residue of the loose material to drop from the folded cart.

Hinges 52 are utilized the mount the sides 26 and 27 on the bottom flanges 34 and 35 for swinging movement from an erected position shown in FIG. 3 to a folded position shown in FIG. 4. In the erected position the sides 26 and 27 are substantially normal to the bottom 22, and in the folded position the sides 26 and 27 contact each other between the bottom flanges 34 and 35 in planes generally parallel to the bottom 22 as shown in FIG. 8. The upper edges of the sides 26 and 27 have rolled portions 54 and 55 respectively while the edges which engage the front 24 at the front flanges 42 and 43 likewise have rolled portions 56 and 57 for additional strength.

Referring to FIG. 7 means are provided for securing the sides 26 and 27 to the front flanges 42 and 43 respectively. In the preferred embodiment pins 58 and 59 protrude from the forwardmost upper corner of the triangular sides 26 and 27 respectively, and these pins are received in suitable apertures 60 in the front flanges 42 and 43. A suitable clamp 61 shown in FIGS. 4 and 7 is utilized in conjunction with the pins 58 and 59 to restrain the sides 26 and 27 from moving from the erected position of FIG. 3 to the folded position of FIG. 4. Likewise a suitable catch 62 is mounted on the stiffener wall 38 to retain the front 24 in the closed position.

Longitudinally extending handles 28 and 29 extend through suitable apertures in the stiffener wall 38 for rotation therein, and a forward portion of each handle 28 and 29 between the wheels 30 and 31 and the legs 32 and 33 respectively is pivotally secured to the bottom 22 by hinge knuckles 63 shown in FIG. 6.

The upper or rear portion 64 of each handle 28 and 29 is curved downwardly to facilitate rotation of the handles in the directions shown by the arrows A and B in FIG. 4 in the hinge knuckles 63 and the stiffner wall 38. Suitable hand grips 65 may be provided on the curved end portions 64 of the handles 28 and 29, and the end of each handle 28 and 29 opposite the curved portion 64 that carries the hand grip 65 is received by its respective hinge knuckle 63.

Stub axles 68 and 69 are mounted on brackets 70 and 71 respectively at the forward ends of the handles 28 and 29 respectively adjacent the stops 46. Each of the brackets 70 and 71 comprises a pair of flanges 72 and 73 connected by a web 74, and the end portion of one of the handles 28 or 29 extends through apertures in the flanges 72 and 73 while a pin 75 extends through both the handle and the web 74 to insure rotation of the bracket 70 or 71 with the handle. A plate 76 extends upward from the web 74 along the outside edges of the flanges 72 and 73 to mount the axle 68 or 69 and to limit rotation of the handle 28 or 29 by engaging an outer wall 77 of the adjacent stop 46 as shown in FIG. 10. Thus the proper positioning of the wheels 30 and 31 for forward movement of the cart 20 is assured.

An important feature of the invention is the provision of additional support at the center of the cart 20 for greater load carrying capacity. More particularly the upper edge surface of each of the flanges 72 and 73 is cammed as shown in FIGS. 10 and 11, and this edge surface of the rearmost flange engages a center plate 78 of the stop 46 when the wheels 30 and 31 are rotated to the position shown in FIG. 10. The center plate 78 is quite rugged and carries a front engaging lip 79 at the forward end together with a spacing tab 80 at the rear end.

The handles 28 and 29 are maintained in their normal position shown in FIG. 1 for ground engagement of the wheels 30 and 31 and the legs 32 and 33 by suitable locking clips 82 and 83 respectively. The locking clip 82 has a bottom leg 84 which has one end thereof mounted on a central portion of the bottom 22 and its other end is pivotally connected to one end of a brace leg 85 of the locking clip 82. The opposite end of the brace leg 85 is secured to a cross brace 86 on the leg 32. A hinge 87 is located in the bottom leg 84 of the locking clip 82 adjacent to the bottom 22. When the handle 28, for example (FIG. 5), is rotated in a counterclockwise direction the bottom leg 84 and the brace leg 85 are swung into their extended positions and the locking clip 82 prevents the wheel 30 from rotating more than 90° and secures said wheel 30 in a position perpendicular to the bottom 22. When the locking clip 82 is in its extended position, the handle 28 cannot be rotated in a clockwise direction until pressure is applied to the pivot point joining the bottom leg 84 and the brace leg 85 whereby the locking clip is released and the handle 28 can be returned to the position shown in FIG. 5. Likewise, the clip 83 consists of a bottom leg 88, one end of which is mounted on the bottom 22 and the opposite end of which is pivotally secured to one end of a brace leg 89. The other end of the brace leg 89 is mounted on a cross brace 90 on the leg 33. A hinge 91 is located in the bottom leg 88 adjacent to the bottom 22. The locking clip 83 operates in a similar manner to the above described operation of the locking clip 82.

In operation the parts of the cart 20 are in the positions indicated in FIGS. 1 and 2, and when the parts are so opened or erected the cart may readily be used to handle loose material such as dirt, fertilizer, peat, etc. When it is desired to transport contained material, such as bagged fertilizer or large cans of material that would not normally fit in the cart 20, the sides 26 and 27 are moved to the folded position shown in FIG. 4 while the front 24 is left in the open position. If it becomes desirable to move the cart sideways such as along a row or at the edge of a lawn, the handles 28 and 29 are rotated through ninety degrees in the direction of the arrows A and B respectively as shown in FIG. 4 upon release of the clips 82 and 83 until the wheels 30 and 31 reach the position shown in FIG. 3. The wheels are also in this rotated position in FIG. 5. This enables the cart 20 to be moved in a sideways direction at right angles to the extent of the handles 28 and 29.

When it is desired to store the cart, the sides 26 and 27 are first moved to the folded position of FIG. 4 by releasing the clamping means 61. Thereupon the front 24 is moved in the direction of the arrow C in FIG. 4 to the position shown in FIG. 5 and the handles are turned in the manner previously described to the position indicated in FIG. 5.

While the preferred embodiment of the invention has been shown, various modifications can be made without departing from the spirit of the invention or the scope of the appended claims.

I claim:

1. In a loose material carrying cart of the type comprising a bottom and a front and an open position for carrying said loose material and a closed position for storage; the improvement comprising outwardly directed, fixably secured, flanges on said bottom, an outwardly directed lip on said bottom extending between said outwardly directed flanges, mating flanges fixably secured on said front directed toward said bottom, a mating lip on said front extending between said mating flanges and directed toward said bottom, and means for pivotally connecting said mating flanges to said outwardly directed flanges for swinging movement about an axis adjacent to but spaced from both said lips whereby said lips move from substantial juxtaposition in said open position for containing said loose material to a spaced apart position in said closed position forming a slot therebetween for the passage of material residue.

2. A folding lawn cart comprising a rigid bottom, upwardly directed flanges on opposite edges of said bottom, a rigid front at an edge of said bottom extending between said flanges, mating flanges on said front directed toward said bottom, said flanges and said mating flanges lying in juxtaposed parallel planes and having overlapping end portions, means for pivotally attaching end portions of said mating flanges to end portions of said outwardly directed flanges for swinging movement of said front relative to said bottom from an open position for transporting loose material to a closed position for storage wherein said front lies in a plane substantially parallel to said bottom, spaced sides extending between said upwardly directed flanges and said mating flanges in said open position, means for hingedly connecting said sides to said outwardly directed flanges for swinging movement from an erected position between said outwardly directed and mating flanges to a folded position wherein said sides are in planes generally parallel to said bottom, longitudinally extending handles positioned adjacent said bottom on the opposite side thereof from said outwardly extending flanges, and a ground engaging wheel rotatably mounted on each handle, said handles being pivotally secured to said bottom for movement from a first position wherein said wheels are in planes substantially normal to said bottom for ground engagement to a second position wherein said wheels are in a plane generally parallel to said bottom for sideways movement of said cart.

3. A folding lawn cart comprising a rigid bottom, a pair of outwardly directed flanges extending along opposite sides of said bottom, a stiffener wall extending along an edge of said bottom between said outwardly directed flanges, a rigid front positioned at an edge of said bottom opposite said stiffener wall, a pair of mating flanges on opposite sides of said front and directed toward said bottom, means for pivotally attaching said mating flanges to end portions of said outwardly directed flanges opposite said stiffener wall for swinging movement of said front relative to said bottom from an open position to a closed position wherein said front lies in a plane substantially parallel to said bottom, said mating flanges having a spacing therebetween slightly larger than spacing between said outwardly directed flanges whereby said mating flanges overlie said outwardly directed flanges in substantial juxtaposition in said closed position, a pair of spaced sides extending between said bottom and said front in said open position, means for hingedly connecting said sides to said bottom for swinging movement from an erected position to a folded position wherein said sides lie between said outwardly directed flanges, handles positioned adjacent said bottom on the opposite side thereof from said outwardly extending flanges, a ground engaging wheel rotatably mounted on the end of each handle, said handles extending through apertures in said stiffener wall and having portions adjacent said wheels pivotally secured to said bottom adjacent said front for movement from a first position wherein said wheels are in planes substantially normal to said bottom for ground engagement to a second position wherein said wheels are in a plane generally parallel to said bottom for sideways movement of said cart, and means for relatively locking said handles in said first position.

4. A folding lawn cart comprising a rigid bottom, a pair of flanges extending along opposite sides of said bottom and normal thereto for imparting rigidity to said bottom, a stiffener member extending along an edge of said bottom between said flanges, a rigid front positioned at an edge of said bottom opposite said stiffener member, means for pivotally attaching said front to said flanges for swinging movement of said front relative to said bottom from an open position to a closed position wherein said front lies in a plane substantially parallel to said bottom, a pair of spaced sides extending between said flanges and said front in said open position, means for mounting said sides for swinging movement from an erected position between said bottom and said front to a folded position wherein said sides lie in planes generally parallel to said bottom whereby said front can be left in an open position; a pair of spaced handles positioned below said bottom adjacent said flanges, a ground engaging wheel rotatably mounted on an end of each handle, said wheel being located substantially at the center of said cart, and a ground engaging leg portion extending downwardly from each of said handles in a plane parallel to the plane of its respective wheel, said handles extending through apertures in said stiffener member and having portions between said wheels and said legs pivotally secured to said bottom adjacent said front for movement from a first position wherein said wheels and legs lie in planes substantially normal to said bottom for ground engagement to a second position wherein said wheels and said legs lie in planes generally parallel to said bottom.

5. A folding lawn cart comprising a rigid bottom, an outwardly directed lip extending along an edge of said bottom, a rigid front positioned adjacent said lip, means for mounting said front for swinging movement relative to said bottom from on open position for transporting loose material to a closed position for storage wherein said front lies in a plane substantially parallel to said bottom, a mating lip extending along an edge of said front in overlying relationship and in engagement with said outwardly directed lip in said open position, said mating lip being spaced from said first lip in said closed position to provide a slot in the lowermost portion of said body for passage of residue of said loose material, a pair of spaced sides extending between said bottom and said front in said open position, ground engaging wheels rotatably mounted adjacent said lips, and means for pivotally mounting said wheels for movement from a first position wherein said wheels lie in plane substantially normal to said bottom for ground engagement to a second position wherein said wheels lie in planes generally parallel to said bottom for sideways movement of said cart.

References Cited in the file of this patent

UNITED STATES PATENTS

| | | |
|---|---|---|
| 2,680,027 | De Puydt et al. | June 1, 1954 |
| 2,767,996 | Seyforth | Oct. 23, 1956 |
| 2,891,802 | Moran | June 23, 1959 |